US012794876B2

(12) United States Patent
Turner

(10) Patent No.: US 12,794,876 B2
(45) Date of Patent: Nov. 10, 2026

(54) SYSTEMS AND METHODS FOR IMPROVED DATA PROCESSING OF SECURED DATASETS ACROSS SECURED COMPUTING NETWORKS WHILE MAINTAINING ENCRYPTION OF SECURED DATA

(71) Applicant: Capital One Services, LLC, McLean, VA (US)

(72) Inventor: Taylor Turner, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 87 days.

(21) Appl. No.: 18/923,577

(22) Filed: Oct. 22, 2024

(65) Prior Publication Data

US 2026/0113310 A1 Apr. 23, 2026

(51) Int. Cl.
*H04L 9/40* (2022.01)
*G06N 3/08* (2023.01)

(52) U.S. Cl.
CPC ............. *H04L 63/083* (2013.01); *G06N 3/08* (2013.01)

(58) Field of Classification Search
CPC ................................ H04L 63/083; G06N 3/08
See application file for complete search history.

(56) References Cited

U.S. PATENT DOCUMENTS 12,362,906 B2 * 7/2025 Lee ......................... G10L 15/26
12,443,595 B1 * 10/2025 Sehwag .............. G06F 16/2425
12,481,665 B1 * 11/2025 Gargano ........... G06F 16/24575
12,505,250 B1 * 12/2025 Tran .................... G06F 21/6245
12,506,589 B1 * 12/2025 Vrubel .................... H04L 9/008
12,554,780 B1 * 2/2026 Han ........................ G06F 16/93
12,554,932 B2 * 2/2026 Chandrahasan .... G06F 16/9537
12,555,008 B1 * 2/2026 Singh ....................... G06N 5/04
12,556,533 B1 * 2/2026 Gu ........................ H04L 63/083
12,614,234 B2 * 4/2026 Fields ..................... G06F 40/30
2003/0115193 A1 * 6/2003 Okamoto .............. G06F 16/337
2019/0227980 A1 * 7/2019 McMahan ............... H04L 63/00
2019/0334877 A1 * 10/2019 Singhvi ............... H04L 63/0428
2020/0151575 A1 * 5/2020 Cabrera Arevalo ... G06N 3/084
2021/0073393 A1 * 3/2021 Jacobson ................. G06N 3/08
(Continued)

OTHER PUBLICATIONS

Zhang et al., PrivacyAsst: Safeguarding User Privacy in Tool-Using Large Language Model Agents, IEEE, 2024.*
(Continued)

*Primary Examiner* — David Garcia Cervetti
(74) *Attorney, Agent, or Firm* — Foley & Lardner LLP

(57) ABSTRACT

Systems and methods for improved data processing of large datasets across secured computing networks. For example, the system may receive a first secured processing request for processing a first secured dataset stored at a first secured network location of a first secured computer network. The system may, in response to receiving the first processing request, generate a first secured data profile of the first secured dataset. The system may generate a first secured data key for the first secured data profile, wherein the first secured data key indicates a first secured profiling type of a plurality of secured profiling types used to generate the first secured data profile. The system may generate a first vectorized representation of the first secured data profile and the first secured data key.

20 Claims, 4 Drawing Sheets

400

(56) References Cited

U.S. PATENT DOCUMENTS

| | | | | |
|---|---|---|---|---|
| 2023/0259716 | A1* | 8/2023 | Merler | G06N 3/096 704/9 |
| 2024/0097878 | A1* | 3/2024 | Lee | H04L 63/0442 |
| 2024/0106627 | A1* | 3/2024 | Prasad | H04L 9/008 |
| 2024/0242039 | A1* | 7/2024 | Gao | G06F 40/40 |
| 2024/0281663 | A1* | 8/2024 | Chen | G06N 3/0895 |
| 2024/0311579 | A1* | 9/2024 | Dong | G06F 40/284 |
| 2024/0411992 | A1* | 12/2024 | Pentyala | G06F 40/284 |
| 2025/0036800 | A1* | 1/2025 | Joshi | G06F 40/20 |
| 2025/0039168 | A1* | 1/2025 | Castinado | H04L 63/083 |
| 2025/0047295 | A1* | 2/2025 | Galvin | G06N 3/0455 |
| 2025/0068625 | A1* | 2/2025 | Currell | G06F 16/243 |
| 2025/0131122 | A1* | 4/2025 | Song | G06F 21/6245 |
| 2025/0156413 | A1* | 5/2025 | Barkan | G06F 16/243 |
| 2025/0156535 | A1* | 5/2025 | Keller | G06F 21/554 |
| 2025/0173343 | A1* | 5/2025 | Perinchery | G06F 16/7343 |
| 2025/0181835 | A1* | 6/2025 | Jin | G06F 40/30 |
| 2025/0181899 | A1* | 6/2025 | Ajmera | G06N 3/0475 |
| 2025/0192980 | A1* | 6/2025 | Patil | G06F 16/254 |
| 2025/0209206 | A1* | 6/2025 | Chen | H04L 67/306 |
| 2025/0217341 | A1* | 7/2025 | Titus | G06F 16/2237 |
| 2025/0252111 | A1* | 8/2025 | Aggarwal | G06F 16/24578 |
| 2025/0254051 | A1* | 8/2025 | Spiers | G06F 16/33295 |
| 2025/0259075 | A1* | 8/2025 | Crabtree | G06F 16/3344 |
| 2025/0309917 | A1* | 10/2025 | Galvin | G06N 3/047 |
| 2025/0317297 | A1* | 10/2025 | Ustyuzhanin | H04L 9/008 |
| 2025/0317424 | A1* | 10/2025 | Ustyuzhanin | H04L 9/008 |
| 2025/0321968 | A1* | 10/2025 | Oakley | G06F 16/24578 |
| 2025/0323777 | A1* | 10/2025 | Refael Kalim | H04L 9/008 |
| 2025/0335521 | A1* | 10/2025 | Tenneti | G06F 16/9532 |
| 2025/0348480 | A1* | 11/2025 | Weik | G06F 21/6245 |
| 2025/0365007 | A1* | 11/2025 | Galvin | H03M 7/3059 |
| 2025/0371015 | A1* | 12/2025 | Wu | G06F 16/24575 |
| 2025/0371189 | A1* | 12/2025 | Nijasure | G06F 21/62 |
| 2025/0377905 | A1* | 12/2025 | Hughes | G06F 9/44584 |
| 2025/0378188 | A1* | 12/2025 | Hughes | G06F 21/6218 |
| 2025/0378268 | A1* | 12/2025 | Yarabolu | G06F 40/20 |
| 2025/0390606 | A1* | 12/2025 | Singh | G06F 21/6263 |
| 2025/0390768 | A1* | 12/2025 | Turrell | G06N 5/022 |
| 2026/0003480 | A1* | 1/2026 | Wilson | G06F 3/0484 |
| 2026/0003516 | A1* | 1/2026 | Nguyen | G06F 3/0622 |
| 2026/0003874 | A1* | 1/2026 | Jootoo Ramesh Bapu | G06F 16/24569 |
| 2026/0003901 | A1* | 1/2026 | Wald | G06F 16/3329 |
| 2026/0006008 | A1* | 1/2026 | Nguyen | H04L 63/0428 |
| 2026/0006097 | A1* | 1/2026 | Pastor | H04L 67/50 |
| 2026/0017297 | A1* | 1/2026 | Turner | G06F 16/3337 |
| 2026/0030277 | A1* | 1/2026 | Agarwal | G06F 9/451 |
| 2026/0050740 | A1* | 2/2026 | Agostinelli | G06F 40/284 |
| 2026/0056950 | A1* | 2/2026 | So | G06F 16/24542 |
| 2026/0064886 | A1* | 3/2026 | Joshi | G06F 21/6245 |

OTHER PUBLICATIONS

Michikata et al., Applying Homomoprhic Encryption to Data Spaces, IEEE, 2023.*

* cited by examiner

SYSTEMS AND METHODS FOR IMPROVED DATA PROCESSING OF SECURED DATASETS ACROSS SECURED COMPUTING NETWORKS WHILE MAINTAINING ENCRYPTION OF SECURED DATA

BACKGROUND

A large language model (LLM) is a type of artificial intelligence designed to understand and generate human language. These models are trained on vast amounts of text data from various sources, such as books, articles, websites, and more. They use deep learning techniques, particularly neural networks, to identify patterns, relationships, and structures within the language. As a result, LLMs can perform a wide range of language tasks, including answering questions, generating creative writing, summarizing text, translating languages, and even engaging in conversation. Their ability to process and generate text in a way that mimics human language makes them useful across various fields, from customer service and content creation to research and education. However, they are not perfect, and their responses are based on patterns in the data they have been trained on, meaning they can sometimes produce incorrect or biased information.

SUMMARY

Systems and methods are described herein for novel uses and/or improvements to large language models (LLMs). As one example, systems and methods are described herein for novel uses and/or improvements to LLMs, particularly when summarizing large datasets. For example, LLMs are technically poor at summarizing large datasets of numerical data in response to textual inputs because their architecture is optimized for processing and understanding language, not for performing advanced numerical reasoning or calculations. While LLMs can recognize patterns and relationships within textual data, they are not inherently equipped to handle or interpret complex numerical datasets with the precision required for tasks like statistical analysis or data summarization. Their training primarily focuses on vast amounts of text, meaning they often lack the ability to accurately interpret and manipulate numerical data at scale. Additionally, LLMs rely on patterns from their training data, and they may struggle with tasks that require rigorous, context-specific mathematical reasoning. As a result, when asked to summarize large datasets, they may generate general insights or approximate conclusions without understanding the exact numerical details, leading to errors or oversimplifications. Specialized tools like spreadsheets or data processing algorithms are typically better suited for handling large-scale numerical data.

Moreover, in many instances, training an LLM (if possible) on numerical data at scale may involve the LLM using data of a specific nature and having specific content. While training data featuring human language may be available in vast amounts from publicly available books, articles, and websites, numerical data of the specific nature and having specific content is not. Thus, training an LLM on this data may involve the use of non-public, and likely, sensitive data, which raises both security and privacy concerns.

To overcome these technical deficiencies in LLMs for this practical benefit, methods and systems disclosed herein training an LLM to generate textual summaries of inputted vectorized representations based on data keys detected in the inputted vectorized representations in response to queries.

For example, the generating a data profile by vectorizing large datasets and providing a data profiling key for each vectorized dataset helps overcome the limitations of large language models (LLMs) in recognizing patterns and relationships within numerical or structured data. When datasets are vectorized, their information is transformed into numerical representations that LLMs can better process because these vectors capture underlying patterns and relationships in a structured, mathematical form. The data profiling key, which indicates a specific profiling type (such as statistical summaries, distributions, or correlations), serves as a guide for interpreting these vectors. This allows the LLM to better understand the context and type of data it is working with, enabling it to focus on specific profiling tasks, such as identifying trends or anomalies, rather than being overwhelmed by raw, unstructured numerical data. In this way, the vectorization and profiling key create a bridge between the language-processing abilities of LLMs and the complex, structured nature of large datasets, allowing the model to generate more accurate and insightful summaries of the data.

To provide this technical benefit, the system embeds the data profiling key into the vectorized data profile by associating each vector representation of the dataset with a corresponding key that defines the specific type of profiling or analysis applied to that data. This key acts as metadata that informs the model about the context of the data, such as whether it represents a statistical summary, a distribution, a correlation, or any other type of profiling. When the dataset is vectorized, its numerical values are transformed into vectors that capture relationships and patterns. Simultaneously, the data profiling key is embedded alongside these vectors, either as part of the vector structure or through a linked metadata framework. This integration ensures that when the large language model processes the vectorized data, it also takes into account the profiling key, which guides it in interpreting the numerical data according to the profiling type. This structured approach enhances the model's ability to understand the significance of the patterns within the data, allowing it to generate more relevant and accurate outputs based on the specific profiling task. By embedding the key directly into the data profile, the system creates a seamless connection between the raw data and the profiling context, improving the model's performance on numerical tasks. Additionally, as the LLM uses vectorized representations of the datasets as opposed to the data itself, the privacy and security concerns are mitigated.

In some aspects, systems and methods for improved data processing of large datasets across secured computing networks are described. For example, the system may receive a first secured processing request for processing a first secured dataset stored at a first secured network location of a first secured computer network. The system may, in response to receiving the first processing request, generate a first secured data profile of the first secured dataset. The system may generate a first secured data key for the first secured data profile, wherein the first secured data key indicates a first secured profiling type of a plurality of secured profiling types used to generate the first secured data profile. The system may generate a first vectorized representation of the first secured data profile and the first secured data key. The system may receive, via a first user interface, a first query corresponding to the first secured dataset. The system may, in response to the first query, input the first vectorized representation into a large language model stored at a second secured network location of the first secured computer network, wherein the large language model is trained to generate textual summaries of inputted vectorized representations based on data keys detected in the inputted vectorized representations in response to queries. The system may generate for display, in the first user interface, a first textual summary output by the first large language model in response the first query.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
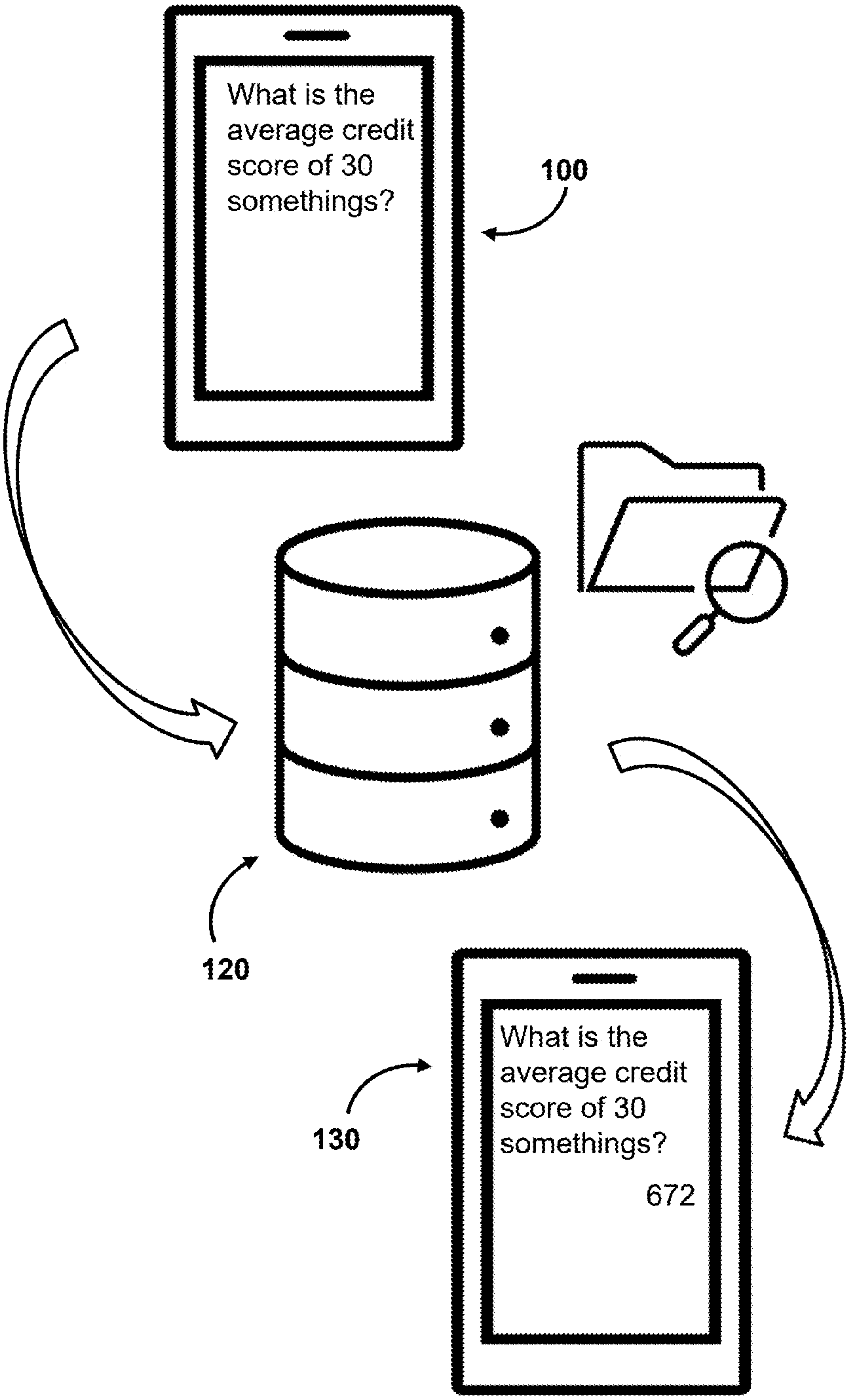
FIG. 1 shows an illustrative diagram for user interface queries to a secured database, in accordance with one or more embodiments.

FIG. 1 shows an illustrative diagram for user interface queries to a secured database, in accordance with one or more embodiments. For example, FIG. 1 shows user interface 100. As referred to herein, a "user interface" may comprise a human-computer interaction and communication in a device, and may include display screens, keyboards, a mouse, and the appearance of a desktop. For example, a user interface may comprise a way a user interacts with an application or a website.

User interface 100 comprises a first query (e.g., "What is the average credit score of 30 somethings?"). For example, when the system processes a user query into user interface 100 (which may comprise a chatbot application), the system may perform several steps to generate a relevant response. First, the user's input is received and tokenized by the system, meaning the text is broken down into smaller units, such as words or phrases, that the system can more easily analyze. Second, the system uses natural language processing (NLP) techniques to understand the intent behind the query. This involves identifying key components like the topic, any entities mentioned, and the sentiment or tone of the message. Based on this understanding, the system accesses its knowledge base, pre-trained language models, or external data sources to retrieve or generate a response that aligns with the user's query.

The system may also perform additional tasks, such as recognizing whether the query involves a specific task (e.g., booking a reservation, or providing customer support) or requires contextual awareness from prior exchanges in the conversation. The system then formulates a coherent response, often using natural language generation (NLG) techniques to ensure that the reply is human-like and understandable. Finally, the response is sent back to the user, allowing the conversation to continue seamlessly. This process may happen in real time, enabling the system to quickly and efficiently handle user queries.

User interface 100 may receive and/or generate various types of content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

In some embodiments, the system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

In some embodiments, the system may use one or more LLMs to respond to the query. LLMs are technically poor at summarizing large datasets of numerical data in response to textual inputs because their architecture is optimized for processing and understanding language, not for performing advanced numerical reasoning or calculations. While LLMs can recognize patterns and relationships within textual data, they are not inherently equipped to handle or interpret complex numerical datasets with the precision required for tasks like statistical analysis or data summarization. Their training primarily focuses on vast amounts of text, meaning they often lack the ability to accurately interpret and manipulate numerical data at scale. Additionally, LLMs rely on patterns from their training data, and they may struggle with tasks that require rigorous, context-specific mathematical reasoning. As a result, when asked to summarize large datasets, they may generate general insights or approximate conclusions without understanding the exact numerical details, leading to errors or oversimplifications. Specialized tools like spreadsheets or data processing algorithms are typically better suited for handling large-scale numerical data.

Moreover, in many instances, training an LLM (if possible) on numerical data at scale may involve the LLM using data of a specific nature and having specific content. While training data featuring human language may be available in vast amounts from publicly available books, articles, and websites, numerical data of the specific nature and having specific content is not. Thus, training an LLM on this data may involve the use of non-public, and likely, sensitive data, which raises both security and privacy concerns.

Sensitive data, often referred to as Personally Identifiable Information (PII), includes any information that can be used to identify, contact, or locate an individual, either on its own or in combination with other information. PII data can range from obvious details like names, addresses, and social security numbers to more subtle information like IP addresses, login credentials, or biometric data (e.g., fingerprints or facial recognition data). Sensitive data also includes financial information, medical records, and any personal details that, if exposed or misused, could lead to privacy violations, identity theft, or other forms of harm to an individual. Because of its potential risks, PII is protected by various data privacy regulations, such as GDPR (General Data Protection Regulation) and CCPA (California Consumer Privacy Act), which require organizations to handle and safeguard this information with the utmost care. Mismanagement or unauthorized disclosure of sensitive data can lead to legal, financial, and reputational damage for both individuals and organizations.

To overcome these technical deficiencies in LLMs, the system may train an LLM to generate textual summaries of inputted vectorized representations based on data keys detected in the inputted vectorized representations in response to queries. The system may store the vectorized representations of data in database 120. For example, generating a data profile by vectorizing large datasets helps overcome the limitations of large language models (LLMs) in recognizing patterns and relationships within numerical or structured data. When datasets are vectorized, their information is transformed into numerical representations that LLMs can better process because these vectors capture underlying patterns and relationships in a structured, mathematical form.

When the system searches database 120, the system follows a process that leverages both the query's natural language elements and the mathematical structure of the vectorized data. First, the user's query is processed using NLP techniques to understand its intent and key concepts. This understanding is then converted into a vectorized form—a mathematical representation of the query—so that it can be compared with the pre-existing vectorized datasets stored in the database.

The system then performs similarity matching between the query vector and the vectors representing the datasets. Since vectors capture relationships and patterns in a high-dimensional space, the system can efficiently compute the similarity or distance between the query vector and dataset vectors using techniques like cosine similarity or Euclidean distance. This comparison helps the system identify which datasets are most relevant to the user's query, even if the exact terms or phrasing differ between the query and the dataset descriptions. Once the closest matching vectors (and thus datasets) are found, the system retrieves the associated data and formulates a response, presenting the relevant information to the user in a coherent format. This vector-based search method allows for more flexible and efficient retrieval of complex, high-dimensional data, especially in large databases.

Upon finding the information required to respond to the query, the system generates a response (e.g., as shown in user interface 130). For example, once a system finds the information required to respond to a query, it generates a response by organizing and transforming the retrieved data into a coherent, human-readable format. After identifying the relevant datasets or information based on the user's query, the system processes this information using natural language generation (NLG) techniques. The NLG component structures the raw data into meaningful sentences, ensuring that the response directly addresses the user's intent. This involves selecting the most relevant pieces of information, contextualizing them appropriately, and arranging them in a logical flow that is easy for the user to understand.

The system may also take into account the context of the conversation, such as prior exchanges, user preferences, or specific formatting requirements, to tailor the response further. The system may simplify complex or technical data when necessary and ensures that the language used aligns with the user's expectations (e.g., from a user profile), whether formal, casual, or technical. Additionally, the system might handle dynamic content generation, such as updating numbers, summarizing key points, or highlighting important insights based on the data retrieved. Finally, the response is delivered to the user in real time, allowing for a smooth conversational experience while ensuring the information provided is accurate and relevant to the query.

In some embodiments, the system may be designed to generate textual summaries of datasets by leveraging representations of the dataset, profiling types, and an LLM. The system may begin by receiving a user query via an interface, where the query corresponds to a specific dataset. Instead of directly working with the raw dataset, the system retrieves a processed or transformed version of the dataset known as a "first representation." This representation is linked to a specific data key, which corresponds to a particular profiling type. Profiling types may include descriptive statistics, data distributions, correlations, missing data patterns, or anomaly detection, among others. The data key informs the system about what type of profiling or analysis has been performed on the dataset to generate this representation.

Once the first representation is retrieved, it is input into an LLM trained to interpret these dataset representations and generate appropriate textual summaries. The LLM has been trained on a variety of dataset profiles and their corresponding summaries, allowing it to recognize the data keys in the representations and respond accordingly to the user's query. The model produces a textual summary that reflects the insights derived from the dataset, such as statistical summaries, patterns, or other relevant information, depending on the profiling type.

For instance, if the user queries for a summary of a sales dataset, the system might retrieve a representation based on the statistical profile of the dataset, which includes metrics like the mean, median, and range. The LLM would then generate a summary that describes the dataset's characteristics, such as the average sales amount, the range of sales, or trends over time. This summary is then displayed back to the user via the interface. The system supports a variety of profiling types, allowing it to generate summaries for a wide range of insights, from missing data patterns to correlations between variables. By combining the power of dataset profiling, LLM interpretation, and user-driven queries, the system can efficiently produce relevant summaries of complex datasets in a user-friendly manner.

The system may utilize a prompt that incorporates various elements, such as a table of data, metadata of column labels, descriptions of those labels, a user query about the data, and potentially instructions on how the data could be used. For example, the system may receive a user query that may include a specific question about the data (e.g., "What are the average sales per region?") or instructions for how the data should be analyzed or used (e.g., "Generate a summary of key trends"). Along with this query, the system prepares a prompt for the LLM that includes both the data table and its metadata. This metadata consists of column labels and accompanying descriptions, explaining what each label represents in the dataset. For example, a column labeled "Sales" might be described as "total sales amount in USD," while a column labeled "Region" might be described as "geographical sales region."

The system then formats the prompt by combining the table, the metadata, and the user's query or instructions into a structured input for the LLM. The inclusion of metadata is crucial, as it allows the LLM to understand the context and meaning of each data column. For instance, when a column is labeled "Date," the metadata informs the model that this column represents temporal information, which may be relevant when answering time-based queries or identifying trends over time.

Once the prompt is constructed, the LLM processes the input and interprets the user's query in relation to the data. The metadata helps the LLM correctly interpret the column labels, which in turn allows it to accurately apply the user's query or instructions to the dataset. If the query is statistical, the LLM can perform operations like calculating averages, finding correlations, or summarizing trends. If the query involves generating insights or performing more complex analyses, the LLM can use the metadata descriptions to understand how the data should be analyzed or organized.

For example, if the user asks for "the average sales per region," the LLM, guided by the metadata, knows that "Sales" refers to a numerical value and "Region" refers to a categorical group. It then aggregates the sales data by region and calculates the averages accordingly. Similarly, if the user provides more detailed instructions, such as "Generate a summary of the top performing regions over the last quarter," the LLM uses the metadata to identify which columns contain the relevant data (e.g., "Region" and "Date") and filters the dataset appropriately before summarizing the trends.

Finally, the system generates and displays the output based on the LLM's analysis. This output could take various forms, such as a textual summary, a table of aggregated results, or insights derived from the dataset, all tailored to the user's query and instructions. By incorporating the table of data, metadata, and user query into a structured LLM prompt, the system can effectively interpret and analyze the data, providing users with meaningful insights in response to their queries.

In some embodiments, the system may generate a vector representation database by generating first and second secured data profiles of the first secured dataset using first and second secured profiling types of the plurality of secured profiling types, determining the first and second secured data keys for the first and second secured data profiles based on the second secured profiling type, generating a first and second vectorized representations of the second secured data profile and the second secured data key, and storing the first vectorized representation and the second vectorized representation in a vector database, and selecting the first vectorized representation, from the vector database, for inputting into the large language model based on a first query.

For example, the system may generate a vector representation database by following a structured process that begins with generating secured data profiles for a dataset using different profiling types. First, the system generates a first secured data profile of the first secured dataset by applying a specific profiling type from a plurality of secured profiling types, such as statistical summaries, correlations, or distributions. Simultaneously, the system generates a second secured data profile using a different profiling type, capturing additional characteristics of the dataset. These profiles allow the system to analyze the dataset from multiple perspectives, providing a more comprehensive understanding of its contents.

Next, the system determines secured data keys for both profiles. The first secured data key is generated based on the profiling type used for the first secured data profile, while the second secured data key corresponds to the profiling type applied to the second secured data profile. These data keys serve as metadata, guiding the system in interpreting the profiling results and ensuring that each profile is processed according to its specific profiling type. The system then generates vectorized representations of the secured data profiles. It converts the first secured data profile and its corresponding secured data key into a first vectorized representation, which is a high-dimensional numerical encoding of the dataset's key features as derived from the first profiling type. Similarly, it generates a second vectorized representation based on the second secured data profile and its data key. These vectorized representations effectively capture the patterns and insights from the dataset in a form that is easily processed and retrieved.

Once the first and second vectorized representations are generated, the system stores them in a vector database. This database is designed to efficiently manage and retrieve vectorized representations based on the relationships and similarities between the data they represent. When a user submits a query, the system searches the vector database to find the most relevant vectorized representation. It selects the first vectorized representation (or others as needed) based on how well it matches the context of the user's query.

Finally, the system inputs the selected vectorized representation into the LLM. The LLM interprets the vector data and generates a textual summary or response based on the insights embedded in the vector representation. By storing vectorized profiles in a vector database and using them to respond to queries, the system efficiently handles large datasets, enabling fast, relevant, and context-aware outputs in response to complex user queries.

Figure 2:
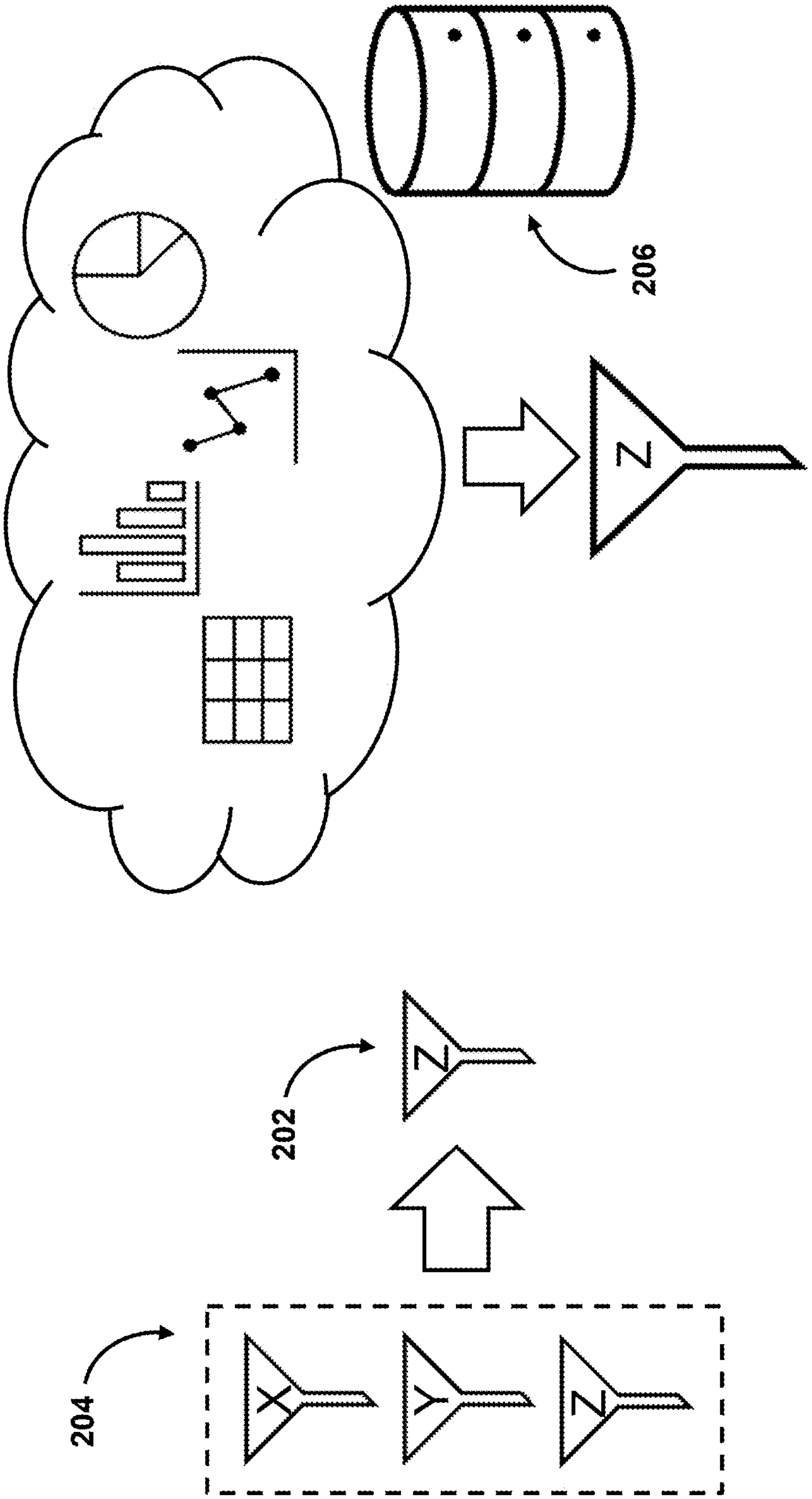
FIG. 2 shows an illustrative diagram for generating a vectorized representation of data, in accordance with one or more embodiments.

FIG. 2 shows an illustrative diagram for generating a vectorized representation of data, in accordance with one or more embodiments. For example, the system may determine data profiling type 202 from plurality of data profiling types 204. The system may then profile dataset 206 using data profiling type 202. During this process, the system may determine a data profiling key, which indicates a specific profiling type (such as statistical summaries, distributions, or correlations), serves as a guide for interpreting these vectors. This allows the LLM to better understand the context and type of data it is working with, enabling it to focus on specific profiling tasks, such as identifying trends or anomalies, rather than being overwhelmed by raw, unstructured numerical data. In this way, the vectorization and profiling key create a bridge between the language-processing abilities of LLMs and the complex, structured nature of large datasets, allowing the model to generate more accurate and insightful summaries of the data.

The data profiling key, which indicates a specific profiling type (such as statistical summaries, distributions, or correlations), serves as a guide for interpreting these vectors. This allows the LLM to better understand the context and type of data it is working with, enabling it to focus on specific profiling tasks, such as identifying trends or anomalies, rather than being overwhelmed by raw, unstructured numerical data. In this way, the vectorization and profiling key create a bridge between the language-processing abilities of LLMs and the complex, structured nature of large datasets, allowing the model to generate more accurate and insightful summaries of the data.

For example, the system may evaluate the nature of the profiling of the dataset—whether it was based on a specific type of statistical data, distributions, correlations, algorithms, instances, time-series information, or other data. The system may use predefined rules or machine learning models to recognize these patterns and/or data. Based on this analysis, the system assigns a profiling key that categorizes the dataset according to a specific profiling type, such as statistical summaries, which might include averages or medians; distributions, which describe the spread or range of the data; or correlations, which highlight relationships between variables.

The profiling key acts as metadata that helps guide the subsequent interpretation of the vectorized representation of the data. This allows the system, or a large language model (LLM), to narrow its focus to the relevant aspects of the data, rather than being overwhelmed by all of the raw, unstructured information. For example, if the profiling key indicates that the data represents a statistical summary, the system knows to look for trends or central tendencies, while a correlation profiling key directs the system to explore relationships between different variables. By using these profiling keys, the system bridges the gap between the LLM's language-processing capabilities and the structured, numerical nature of large datasets. This helps the model generate more accurate and context-specific insights, avoiding errors that may arise from misinterpreting the data.

The system may embed the data profiling key into the vectorized data profile by associating each vector representation of the dataset with a corresponding key that defines the specific type of profiling or analysis applied to that data. This key acts as metadata that informs the model about the context of the data, such as whether it represents a statistical summary, a distribution, a correlation, or any other type of profiling. When the dataset is vectorized, its numerical values are transformed into vectors that capture relationships and patterns. Simultaneously, the data profiling key is embedded alongside these vectors, either as part of the vector structure or through a linked metadata framework. This integration ensures that when the large language model processes the vectorized data, it also takes into account the profiling key, which guides it in interpreting the numerical data according to the profiling type. This structured approach enhances the model's ability to understand the significance of the patterns within the data, allowing it to generate more relevant and accurate outputs based on the specific profiling task. By embedding the key directly into the data profile, the system creates a seamless connection between the raw data and the profiling context, improving the model's performance on numerical tasks. Additionally, as the LLM uses vectorized representations of the datasets as opposed to the data itself, the privacy and security concerns are mitigated.

Figure 3:
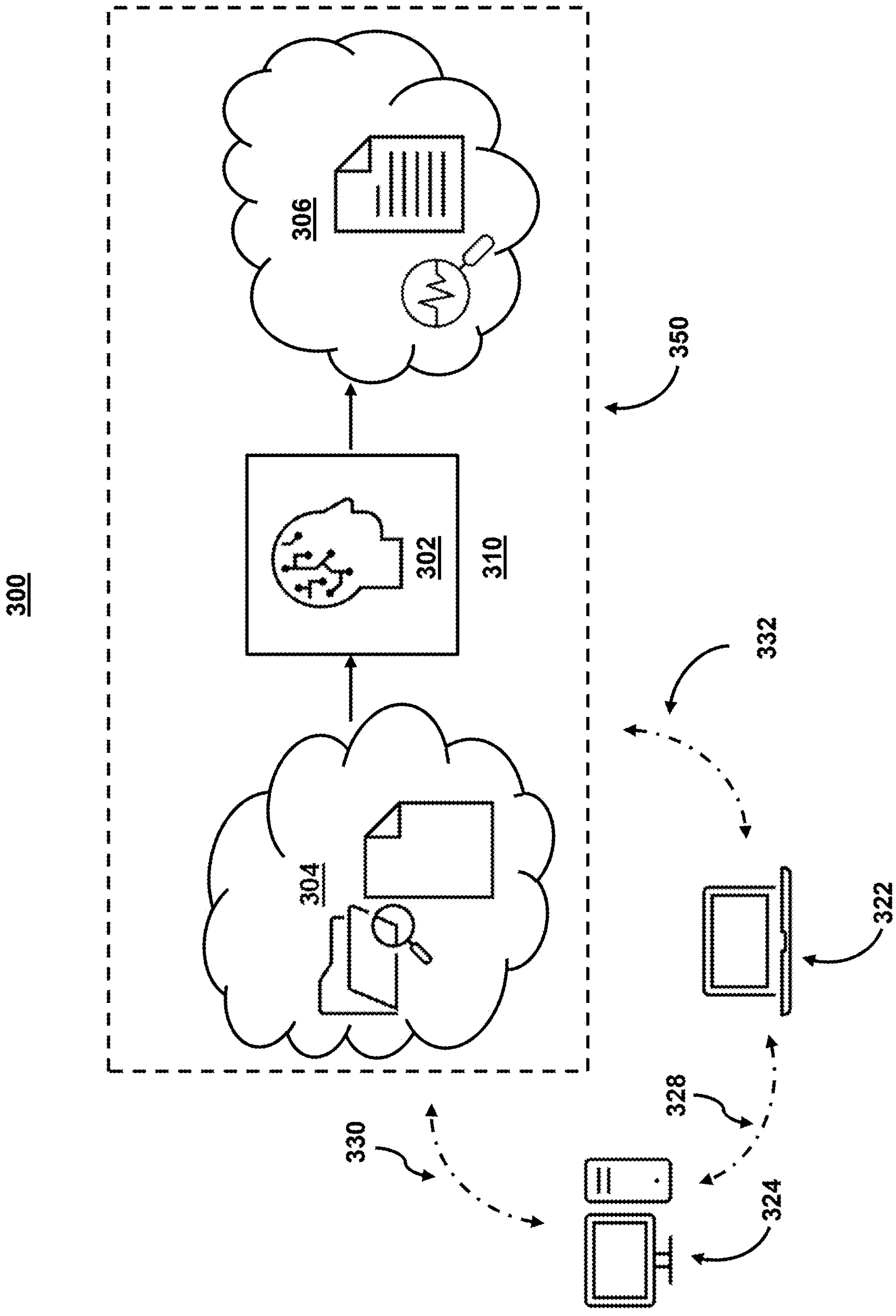
FIG. 3 shows illustrative components for a system used to improve data processing of large datasets while maintaining encryption of secured data, in accordance with one or more embodiments.

FIG. 3 shows illustrative components for a system used to improve data processing of large datasets while maintaining encryption of secured data, in accordance with one or more embodiments. For example, FIG. 3 may show illustrative components for improved data processing of large datasets across secured computing networks.

In some embodiments, the system may detect and use data from different network locations across a computer network by leveraging network protocols, distributed data management techniques, and data access technologies. First, the system is configured to identify and communicate with various network nodes, servers, or databases located at different network locations. This is achieved through standard network communication protocols such as TCP/IP, HTTP, or specialized protocols like REST APIs or SOAP for web services. The system either performs scheduled checks or listens for triggers that notify it of data availability or changes across these distributed locations.

When the system detects data at one of these network locations, it accesses the data using secure authentication and authorization mechanisms, ensuring that only authorized entities can retrieve the information. The system can pull data from these locations in various forms, such as structured datasets (e.g., SQL databases), unstructured data (e.g., files, logs), or real-time streams (e.g., from IoT devices or APIs). Once the data is accessed, the system standardizes and integrates the information into a unified format, which can involve data cleansing, transformation, and mapping processes to ensure consistency across different sources.

The system can also synchronize and aggregate data from multiple locations, ensuring that it combines and uses data efficiently across the network. This distributed data processing approach enables the system to perform tasks like analytics, reporting, or machine learning across different data sources in real-time or batch mode. By detecting and using data from multiple network locations, the system ensures comprehensive data coverage and enables more accurate and informed decision-making across a range of tasks or operations.

As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

In some embodiments, system 300 and/or one or more models herein may be implemented using an application-specific integrated circuit. An integrated circuit may be a small electronic device made of semiconductor material, typically silicon, that contains a large number of microscopic electronic components such as transistors, resistors, capacitors, and diodes. These components are interconnected to perform a specific function or set of functions. Integrated circuits can be classified into various types based on their functionality, such as analog, digital, and mixed-signal ICs. The transistors within an IC are the primary building blocks, as they act as switches or amplifiers for electronic signals. The other components, like resistors and capacitors, are used for controlling voltage, current, and timing within the circuit. System 300 may design the integrated circuit to be application-specific such that design of the circuit is customized for a given application. In some embodiments, system 300 may use an integrated circuit system where one or more integrated circuits are spread throughout a system, network, and/or one or more devices. In such cases, the system design may ensure that the circuits are integrated with other electronic components like connectors, power supplies, and sensors to form a complete and functional electronic system. This integration allows for the implementation of sophisticated tasks in devices needed for one or more specified applications.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming and a manual task. Second, despite the mainstream popularity of artificial intelligence, practical implementations of artificial intelligence may require specialized knowledge to design, program, and integrate artificial intelligence-based solutions, which can limit the amount of people and resources available to create these practical implementations. Finally, results based on artificial intelligence can be difficult to review as the process by which the results are made may be unknown or obscured. This obscurity can create hurdles for identifying errors in the results, as well as improving the models providing the results. These technical problems may present an inherent problem with attempting to use an artificial intelligence-based solution in data processing.

Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., an output based on a query).

In some embodiments, the model (e.g., model 302) may automatically perform actions based on outputs 306. In some embodiments, the model (e.g., model 302) may not perform any actions. The output of the model (e.g., model 302) may be used to generate a response.

In some embodiments, the system may generate predictions related to financial services. For example, the system may use one or more models and/or application to process a variety of data to generate predictions for tasks such as payment card eligibility determinations, fraud detection, and/or determining rates for auto-finance applications. For credit card eligibility, the model may use data such as the applicant's credit score, income, employment history, debt-to-income ratio, and past credit history. This data helps the model predict the likelihood of the applicant repaying the credit card debt. For fraud detection, models analyze transaction data, including the amount, location, frequency, and pattern of transactions. They compare these patterns to known fraudulent behavior to identify potentially fraudulent activities. For determining auto-finance rates, models might use the applicant's credit score, loan amount, loan term, vehicle details, and market interest rates. The data used by these models comes from various sources, including credit bureaus, financial institutions, customer-provided information, transaction records, and public records. By analyzing these data points, models can make informed predictions and decisions that help financial institutions manage risk, provide appropriate services, and enhance customer satisfaction.

In some embodiments, the model may process received data through several stages. For example, the model may collect and aggregate data from various sources (e.g., a user account, industry data, third-party data sources, etc.). The system may ensure the data is cleaned and preprocessed to handle any missing and/or inconsistent information. This preprocessing may include normalizing numerical data, encoding categorical variables, and applying techniques to handle outliers. The model may then use feature engineering to identify and create relevant features that can improve its predictive power. For instance, the system may derive new variables from existing ones, such as calculating the debt-to-income ratio from debt and income data.

Once the data is prepared, the system feeds the data into the model, which could be an artificial intelligence algorithm such as logistic regression, decision trees, and/or neural networks. The model may be trained on historical data, learning patterns, and/or relationships between input features and the target outcomes. During this training process, the system may adjust the model parameters to minimize prediction errors. After training, the system may validate the model and test the model using separate data sets to ensure the model has a predetermined and/or threshold accuracy and generalizability.

In some embodiments, the system may use specialized predictions based on the task. Additionally or alternatively, the system may adjust the inputs and/or outputs based on the determinations and/or predictions required. For example, for credit card eligibility, the model may evaluate the applicant's likelihood of defaulting on payments. In fraud detection, the model may identify anomalies and patterns indicative of fraudulent behavior. In auto-finance rate determination, the model may predict the risk associated with lending to an individual and adjusts the interest rates accordingly. In some embodiments, the entire process may be iterative, with models continually updated and refined as new data becomes available, ensuring they remain effective in making accurate and reliable predictions.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
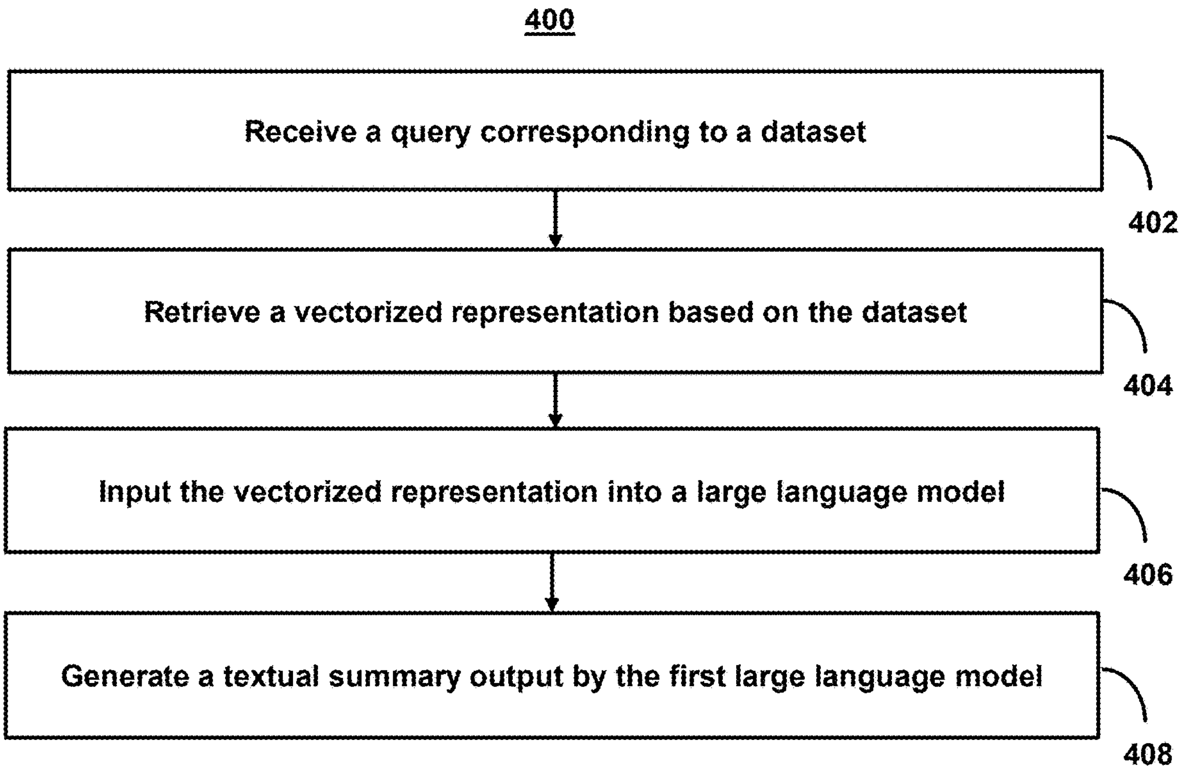
FIG. 4 shows a flowchart of the steps involved in improved data processing of large datasets, in accordance with one or more embodiments.

FIG. 4 shows a flowchart of the steps involved in improved data processing of large datasets, in accordance with one or more embodiments. For example, the system may use process 400 (e.g., as implemented on one or more system components described above) in order to improve data processing of large datasets across secured computing networks.

At step 402, process 400 (e.g., using one or more components described above) receives a query corresponding to a dataset. For example, the system may receive, via a first user interface, a first query corresponding to a first dataset. The system may receive a first query corresponding to a first dataset via a first user interface by allowing the user to input the query through various interaction mechanisms, such as a text box, voice input, or other input fields. The user interface serves as the communication gateway between the user and the system, where the user can type or speak their query, specifying what they are looking for in relation to the first dataset. This interface may be part of a web application, mobile app, or even a chatbot interface, designed to accept and process user inputs. Once the query is entered, the system captures it and parses the input to understand the user's request. The interface may also provide prompts or suggestions to guide the user in formulating their query, ensuring it is relevant to the available data. For example, the query might ask for specific statistics, trends, correlations, or other data-related insights from the first dataset. The system then processes the query using NLP techniques to break it down into actionable components, which can then be matched to the relevant dataset.

At step 404, process 400 (e.g., using one or more components described above) retrieves a vectorized representation based on the dataset. For example, the system may, in response to the first query, retrieve a first vectorized representation, wherein the first vectorized representation is based on a first data profile of the first dataset and a first data key for the first data profile, wherein the first data key indicates a first profiling type of a plurality of profiling types used to generate the data profile.

For example, the system may generate a vectorized representation based on a data profile of a dataset and a data key by first analyzing the dataset and applying the specific profiling type indicated by the data key. The data key informs the system about the type of profiling that was performed to generate the data profile, such as what type of statistical extrapolations, distributions, correlations, and/or regressions were used by the system to extract the relevant features of the dataset. For example, if the data key indicates a first statistical process was used, the system may determine the metrics used like mean, median, variance, or standard deviation. If the key indicates a specific distribution was used, the system may record this information via metadata or specific values embedded in the vector representation.

In some embodiments, the system may generate a first secured data profile of the first secured dataset by selecting the first secured profiling type of the plurality of secured profiling types based on the first secured processing request and executing the first secured profiling type on the first secured dataset. For example, the system may generate a first secured data profile of the first secured dataset by selecting the appropriate secured profiling type from a plurality of secured profiling types based on the specifications in the first secured processing request. When the request is received, it typically includes information about the security requirements, the nature of the dataset, and the specific type of analysis or profiling needed. The system analyzes this request to determine the most suitable profiling type, such as statistical summaries, distribution analysis, correlation analysis, or anomaly detection, depending on the user's objectives and the characteristics of the dataset. After identifying the correct secured profiling type, the system proceeds to execute the profiling type on the secured dataset. This involves applying the specified analytical methods to extract relevant insights from the data while ensuring that security protocols are strictly followed throughout the process. For example, if the selected profiling type is a statistical summary, the system might calculate key metrics such as mean, median, and variance while adhering to encryption or privacy-preserving techniques to protect sensitive information. The secured profiling type ensures that the data is processed in a way that not only fulfills the analytical needs outlined in the request but also maintains the confidentiality and integrity of the dataset. Once the profiling is executed, the system generates a secured data profile, which encapsulates the results of the profiling type and the security measures applied. This secured data profile is then stored or returned for further processing, ensuring that all relevant profiling information is retained in a secure and structured manner, which can later be used to generate vectorized representations or answer specific queries.

In some embodiments, the system may generate the first secured data profile of the first secured dataset by accessing a data stream of the first secured dataset and generating a snapshot of the data stream based on the first secured processing request. For example, the system may generate the first secured data profile of the first secured dataset by first accessing a data stream of the secured dataset, which involves establishing a secure connection to the data source where the dataset is continuously being updated or transmitted. The data stream contains live or near real-time data flowing from a database, an application, or another system. In response to receiving the first secured processing request, which specifies the type of analysis or profiling needed, the system taps into this data stream to capture a snapshot—a static view—of the dataset at a specific point in time. The system ensures that accessing and capturing the data stream adheres to security protocols such as encryption, authentication, and data privacy measures to protect the integrity and confidentiality of the dataset. Based on the instructions in the secured processing request, the system filters or segments the data stream to capture the relevant portion needed for the profiling task. For example, if the request calls for statistical analysis or trend detection, the system collects the necessary data points from the stream that align with these objectives. Once the snapshot of the data stream is captured, the system processes this static view to generate the secured data profile. This involves applying the selected secured profiling type—such as statistical summaries, correlation analyses, or other methods—on the snapshot to extract meaningful insights. The generated secured data profile contains the results of the profiling, encapsulating the key information derived from the snapshot while ensuring that all security requirements are maintained throughout the process. This approach allows the system to work with real-time or dynamic data streams in a secure manner, creating a comprehensive and protected data profile that can be used for further analysis or decision-making.

In some embodiments, the system may generate the first secured data profile of the first secured dataset by receiving a first instance of the first secured dataset, receiving a second instance of the first secured dataset, determining a difference between the first instance and the second instance at a first time point, and determining the first secured data key based on the first time point. For example, the system may generate the first secured data profile of the first secured dataset by following a process that involves comparing multiple instances of the dataset over time. First, the system receives a first instance of the secured dataset at an initial point in time. This instance represents the dataset in its state at the time of capture. The system then receives a second instance of the same secured dataset at a later time point. Both instances are securely stored and processed to ensure data integrity and confidentiality throughout the process. Next, the system determines the differences between the first and second instances of the dataset. This comparison might involve identifying changes in data values, added or removed records, updates to specific fields, or variations in statistical patterns between the two instances. The system executes this analysis to detect any significant alterations that have occurred over the specified time interval. These differences can be critical for various types of profiling, such as identifying trends, anomalies, or shifts in the dataset's structure. Based on this temporal analysis and the detected differences at the first time point (the time of comparison), the system determines the appropriate secured profiling type, which is represented by the first secured data key. The data key is selected according to the type of differences found—whether they relate to statistical changes, updates in distributions, or other relevant factors. For instance, if the system detects statistical variations, the data key might represent a summary profile, whereas significant shifts in data distribution might prompt a distribution profile key. The system then generates the first secured data profile by applying the profiling type indicated by the secured data key to the differences between the dataset instances. This data profile reflects the changes over time, encapsulating both the differences and the security requirements associated with the profiling task. The secured data key ensures that the data profile is contextually accurate and securely aligned with the type of analysis performed at the specified time point.

In some embodiments, the system may generate the first secured data profile of the first secured dataset by receiving the first secured dataset, wherein the first secured dataset has a first identifier, receiving a second secured dataset, wherein the second secured dataset has a second identifier, merging the first secured dataset and the second secured dataset, and determining the first secured data key based on the first identifier and the second identifier. For example, the system may generate the first secured data profile of the first secured dataset by following a process that involves merging two secured datasets and assigning a secured data key based on their identifiers. First, the system receives the first secured dataset, which is uniquely identified by a first identifier. This identifier serves as metadata that distinguishes the dataset and provides context, such as its origin, classification, or the specific security protocols associated with it. Next, the system receives a second secured dataset, which also comes with its own unique identifier, the second identifier, marking it as a separate but potentially related dataset. Once both secured datasets are received, the system merges them. This merging process involves integrating the data from both datasets, ensuring that the system handles overlapping records, common fields, or unique attributes in a way that preserves the integrity and security of both datasets. The merge could include appending data, combining overlapping records, or performing more complex operations like joining based on shared keys or fields. Throughout this process, the system adheres to strict security measures, ensuring that the data remains protected, and that no sensitive information is exposed or mishandled. After the merge is completed, the system determines the first secured data key by considering both the first and second identifiers. The identifiers provide context about the origin and nature of the datasets, which guides the system in selecting the appropriate secured profiling type. For instance, the data key might reflect the type of analysis that should be performed on the merged data, such as statistical summaries, trend analysis, or correlation detection, based on the combined characteristics of the datasets. The system uses the identifiers to ensure that the chosen profiling type accurately reflects the merged data's context and security requirements. Finally, the system generates the first secured data profile by applying the profiling type represented by the secured data key to the merged dataset. This secured data profile encapsulates the integrated insights from both datasets while maintaining their respective security attributes. The data key provides crucial context, allowing future analyses to correctly interpret the merged data and ensuring that the profiling is both secure and aligned with the intended purpose of the datasets.

In some embodiments, the system may generate the first secured data profile of the first secured dataset by receiving the first dataset, wherein the first dataset has a first identifier, receiving a second dataset, wherein the second dataset has a second identifier, merging the first dataset and the second dataset, and determining the first secured data key based on the first identifier and the second identifier. For example, the system may generate the first secured data profile of the first secured dataset by following a process that involves merging two secured datasets and assigning a secured data key based on their identifiers. First, the system receives the first secured dataset, which is uniquely identified by a first identifier. This identifier serves as metadata that distinguishes the dataset and provides context, such as its origin, classification, or the specific security protocols associated with it. Next, the system receives a second secured dataset, which also comes with its own unique identifier, the second identifier, marking it as a separate but potentially related dataset. Once both secured datasets are received, the system merges them. This merging process involves integrating the data from both datasets, ensuring that the system handles overlapping records, common fields, or unique attributes in a way that preserves the integrity and security of both datasets. The merge could include appending data, combining overlapping records, or performing more complex operations like joining based on shared keys or fields. Throughout this process, the system adheres to strict security measures, ensuring that the data remains protected, and that no sensitive information is exposed or mishandled. After the merge is completed, the system determines the first secured data key by considering both the first and second identifiers. The identifiers provide context about the origin and nature of the datasets, which guides the system in selecting the appropriate secured profiling type. For instance, the data key might reflect the type of analysis that should be performed on the merged data, such as statistical summaries, trend analysis, or correlation detection, based on the combined characteristics of the datasets. The system uses the identifiers to ensure that the chosen profiling type accurately reflects the merged data's context and security requirements. Finally, the system generates the first secured data profile by applying the profiling type represented by the secured data key to the merged dataset. This secured data profile encapsulates the integrated insights from both datasets while maintaining their respective security attributes. The data key provides crucial context, allowing future analyses to correctly interpret the merged data and ensuring that the profiling is both secure and aligned with the intended purpose of the datasets.

Once the appropriate profiling is completed, the system transforms the resulting data profile into a vectorized format. This involves converting the key insights or features extracted from the profiling into numerical vectors—high-dimensional representations that capture the relationships, patterns, and structure within the dataset. Each element of the vector corresponds to a specific feature or metric from the data profile. The system ensures that the vector structure aligns with the type of data being represented, allowing the vector to serve as a compact and interpretable mathematical encoding of the data profile.

By embedding the data key into the vectorization process, the system preserves the context of the profiling type, ensuring that the vectorized data is appropriately tailored to the nature of the dataset and its profiling. This vectorized representation enables efficient comparison, retrieval, and analysis by large language models or other AI systems, allowing them to process the dataset more accurately and generate insights or responses based on the specific data characteristics indicated by the data key.

In some embodiments, the system may generate vectorizations of datasets as a routine function and/or at predetermined times. For example, the system may generate a new vectorization as new instances of a dataset are detected. As a routine function, the system may periodically check for updates or changes in the datasets and re-vectorize them at set time intervals, ensuring that the vector representations are always up-to-date. This routine process could be scheduled daily, weekly, or according to the needs of the application to maintain a consistent and accurate vectorized data profile. Additionally or alternatively, the system can generate new vectorizations dynamically when specific events occur, such as when new instances of a dataset are detected or when an existing dataset is modified. For instance, if a system monitors a database for incoming data, it may automatically initiate the vectorization process as soon as new records are added, deleted, or updated. This ensures that the vector representation always reflects the current state of the dataset, allowing any future queries or analyses to be based on the most recent data.

By automating the vectorization process either through time-based scheduling or event-driven triggers, the system ensures that the dataset's vector profiles remain current and aligned with the latest information. This capability is particularly useful for large, dynamic datasets where regular updates occur, as it enables efficient and accurate retrieval, analysis, and query responses based on the most recent data representations.

In some embodiments, in response to receiving a first secured processing request, the system may generate a first secured data profile of the first secured dataset. For example, the system may generate a first secured data key for the first secured data profile, wherein the first secured data key indicates a first secured profiling type of a plurality of secured profiling types used to generate the first secured data profile. The system may then generate a first vectorized representation of the first secured data profile and the first secured data key. For example, in response to receiving a first secured processing request, the system initiates the process of generating a first secured data profile of the first secured dataset by ensuring that all data handling and processing steps adhere to strict security protocols. The system first verifies the security level of the request and applies encryption or other security measures to ensure that both the data and the operations performed on it remain protected. Once the secured dataset is loaded for processing, the system begins profiling the data based on the specific requirements indicated by the request.

In some embodiments, the system may generate the first vectorized representation of the first secured data profile and the first secured data key by determining a metadata framework for the first vectorized representation and embedding the first secured data key into the metadata framework. To generate a first vectorized representation of a first secured data profile and a first secured data key, the system first determines an appropriate metadata framework for organizing and embedding the data key. The metadata framework acts as a structured template that defines how different aspects of the data profile and key are represented within the vectorized format. This framework typically includes predefined fields or dimensions for capturing essential metadata, such as the profiling type, data categories, security classifications, and relationships between data points. By setting up this framework, the system ensures that the vectorized representation can store not only the numerical or statistical characteristics of the data but also the context needed for secure and meaningful interpretation. Once the metadata framework is established, the system proceeds by embedding the first secured data key, which indicates the profiling type (such as statistical summaries, correlations, or trends), directly into the metadata fields of the vector. This embedding process associates the secured data key with the vectorized representation in a way that preserves both the data profile's context and security information. For example, the data key might be embedded as a tag or label within the vector, indicating the type of analysis or profile that has been applied to the underlying dataset. By embedding the secured data key into the vectorized representation, the system enhances the interpretability and usability of the vector. Any future operations or queries can then reference the profiling type specified by the data key, enabling accurate and secure analysis. This approach also ensures that the security properties of the data are maintained throughout the process, as the metadata framework encapsulates both the data profile and the key within a unified, secure representation. This allows the system to efficiently handle, and process secured data profiles while retaining the ability to interpret the data in context during further processing or query responses.

In some embodiments, the system generates a first vectorized representation of the first secured data profile and the first secured data key by determining a vector structure for the first vectorized representation and embedding the first secured data key into the vector structure. For example, to generate a first vectorized representation of the first secured data profile and the first secured data key, the system begins by determining an appropriate vector structure that will encapsulate the essential characteristics of the data profile while embedding the secured data key. The vector structure serves as the foundational framework in which both the numerical or feature-based aspects of the data and the metadata—such as the secured data key—are stored. This structure is typically designed to handle high-dimensional data, where each dimension corresponds to a specific feature or attribute of the data profile, and is capable of representing complex relationships or patterns within the dataset. Once the vector structure is defined, the system proceeds to embed the first secured data key directly into the vector. The secured data key represents the profiling type (such as statistical summaries, correlations, or distributions) and is integrated into specific dimensions of the vector, ensuring that the profiling context is preserved within the vectorized format. The embedding process involves either appending the secured data key as a set of dedicated elements within the vector or associating it with specific portions of the vector that pertain to the profiling type. This ensures that the vector not only holds the data profile's numerical features but also encodes the security and context provided by the data key. By embedding the secured data key into the vector structure, the system creates a unified and secure representation of the dataset that can be used for further processing, querying, or analysis. This vectorized representation allows downstream systems, such as machine learning models or large language models, to interpret the data profile in context, using the secured data key to focus on the appropriate profiling type. This approach maintains the integrity and security of the data throughout the vectorization process, while also ensuring that the vector structure is flexible and informative enough to support accurate and context-aware data interpretation.

In some embodiments, the system may generate a first secured data key, which identifies the specific profiling type (such as statistical summaries, correlations, distributions, or other analytical profiles) that is applied to the dataset. This data key acts as metadata, guiding the profiling process by indicating which secured profiling methods should be used to extract the relevant features and insights from the dataset. The profiling itself is executed in a manner that preserves the security and privacy of the data, ensuring that no sensitive information is exposed during the analysis. After the secured profiling is completed, the system generates a first vectorized representation of the data profile, transforming the profile into a mathematical format that encapsulates the key characteristics of the dataset while maintaining its security. The vectorized representation is combined with the first secured data key, embedding the profiling type information into the vector structure. This integration allows the system to handle and interpret the secured data profile more effectively in future queries or processing tasks. By ensuring that both the data profile and data key are securely managed and transformed into a vectorized format, the system enables secure and efficient data processing without compromising the integrity or confidentiality of the secured dataset.

In some embodiments, the system may generate the first secured data key by determining the first secured profiling type of the plurality of secured profiling types, selecting a first value corresponding to the first secured profiling type, and embedding the first value in the first vectorized representation. For example, the system generates a first secured data key by first determining the appropriate secured profiling type from a plurality of secured profiling types based on the characteristics and context of the data being processed. The secured profiling type could represent various types of analysis, such as statistical summaries, correlations, distributions, or other data-specific insights. The system determines the most relevant profiling type by evaluating the nature of the dataset and the security requirements associated with it. This could involve examining the structure, sensitivity, and intended use of the data to select the best-fitting profiling type for generating meaningful and secure insights. Once the secured profiling type is determined, the system selects a corresponding value or code that represents the chosen profiling type. This value serves as the identifier for the profiling type within the system's framework and encapsulates the method or analysis applied to the dataset. For instance, a profiling type related to statistical summaries might be assigned a specific value that indicates it, while a correlation analysis might be represented by a different value. After selecting the appropriate value for the secured profiling type, the system embeds this value directly into the first vectorized representation of the data. This embedding process integrates the profiling type value as part of the vector's structure, ensuring that the profiling context is retained and that any future processing of the vectorized data is aware of the specific analysis type that was applied. By embedding the secured data key in this way, the system creates a secure and contextually informative representation of the dataset, which helps ensure that subsequent tasks, such as analysis, querying, or interpretation, are conducted with full awareness of the secured profiling type applied to the data. This process guarantees that the data's security, integrity, and analytical context are maintained throughout its lifecycle.

In some embodiments, the system may generate the first vectorized representation of the first secured data profile and the first secured data key by performing a first compression on the first secured dataset when generating the first secured data profile and performing a second compression on the first secured dataset when generating the first vectorized representation. For example, the system may generate a first vectorized representation of the first secured data profile and the first secured data key by using a two-stage compression process—first during the creation of the secured data profile and then during the vectorization process. Initially, when generating the first secured data profile, the system performs a first compression on the secured dataset. This compression is designed to reduce the dataset's size by focusing on essential features and insights relevant to the chosen profiling type, such as statistical summaries, distributions, or correlations. This first compression extracts key information while removing unnecessary or redundant data, ensuring that the profile is compact and efficient without compromising the integrity of the data or its security. This step allows the system to handle large datasets more effectively, particularly when dealing with sensitive information that needs to be processed securely. Once the first secured data profile is created, the system proceeds to generate the first vectorized representation. At this stage, the system performs a second compression on the secured dataset, focusing on transforming the compressed data profile into a high-dimensional vector representation. This second compression further reduces the complexity of the data by encoding it into a structured vector format that captures the essential patterns, relationships, and features in a way that is suitable for machine learning models or other analytical tasks. The second compression is optimized for vectorization, ensuring that the data remains compact, and that the system can efficiently store and process the vector representation. The first secured data key, which indicates the profiling type and security context, is also embedded into the vectorized representation during this process. This ensures that the vector not only captures the compressed features of the dataset but also retains information about the profiling type, allowing future processing tasks to interpret the data in context. By applying both stages of compression, the system generates a vectorized representation that is efficient, secure, and contextually informative, facilitating accurate analysis and query responses while protecting the integrity of the secured dataset.

At step 406, process 400 (e.g., using one or more components described above) input the vectorized representation into a large language model. For example, the system may input the first vectorized representation into a large language model, wherein the large language model is trained to generate textual summaries of inputted vectorized representations based on data keys detected in the inputted vectorized representations in response to queries.

In some embodiments, the large language model is trained to generate textual summaries of inputted vectorized representations based on data keys detected in the inputted vectorized representations by receiving historical vectorized representations with labeled statistical properties and labeled data keys and training the large language model to determining the labeled statistical properties in the historical vectorized representations based on the labeled data keys. For example, the LLM is trained by a system to generate textual summaries of inputted vectorized representations by learning to interpret statistical properties and data keys embedded in those vectors. The training process begins with the system receiving historical vectorized representations that are pre-labeled with their corresponding statistical properties (such as means, variances, correlations, etc.) and associated data keys that indicate the type of profiling applied to the data (e.g., statistical summaries, distributions, trends). These historical examples serve as a foundation for teaching the model how to correlate specific vector patterns with their real-world meanings.

The system feeds these labeled historical vectorized representations into the large language model during training, where the model is tasked with analyzing and understanding the underlying structure of the vectors. The labeled data keys in the vectorized representations serve as a guide, helping the model recognize which profiling type was applied to the dataset, such as whether the data represents a distribution or a correlation. The LLM is trained to identify these data keys and use them to focus on the relevant statistical features within the vectorized data. During this training process, the model is optimized to detect patterns and extract the labeled statistical properties based on the profiling type indicated by the data keys. For example, if a vectorized representation is labeled with a data key indicating a statistical summary, the model learns to detect features such as averages, medians, or trends within the vector and generate descriptive text that accurately summarizes those features. Through repeated exposure to historical data with varied statistical properties and data keys, the model refines its ability to generate coherent, contextually accurate textual summaries. As the training progresses, the large language model becomes proficient at generating textual summaries from unseen vectorized representations by accurately interpreting the data keys and statistical properties embedded in the vectors. Once trained, the LLM can process new vectorized data, detect the data key, and generate human-readable summaries that reflect the underlying statistical insights in the dataset. This enables the system to efficiently generate data-driven text outputs based on complex vectorized inputs.

In some embodiments, the large language model is trained by the system to generate textual summaries of inputted vectorized representations based on data keys detected in the inputted vectorized representations by receiving labeled statistical properties and labeled keywords in potential queries and training the large language model to determine the labeled statistical properties based on the labeled keywords in potential queries. For example, the LLM may be trained by the system to generate textual summaries of inputted vectorized representations by learning to associate specific keywords in potential queries with relevant statistical properties. The training process begins by feeding the model labeled training data that includes both vectorized representations of datasets with their corresponding statistical properties (such as means, medians, distributions, and correlations) and potential user queries labeled with specific keywords that map to those statistical properties. For example, a potential query might include keywords like "average," "trend," or "distribution," which indicate that the user is asking for certain types of statistical insights. These keywords are labeled and associated with the appropriate statistical properties found in the vectorized data. The system trains the large language model to recognize these keywords in queries and to understand that they correspond to specific statistical features in the vectorized representation. During training, the LLM learns to identify patterns between the keywords in the queries and the relevant statistical properties within the vectorized representations. For instance, when a query includes the keyword "average," the model learns to look for statistical summaries related to central tendency, such as means or medians, within the vectorized data. Similarly, if the query includes a keyword like "correlation," the model is trained to detect patterns in the vector that describe relationships between different variables. Through repeated exposure to labeled queries and vectorized data, the LLM becomes proficient in linking keywords from potential queries to the appropriate statistical properties in the data. As a result, once trained, the model can effectively interpret a user's query, detect the keywords, and use those keywords to determine which statistical properties to focus on in the vectorized representation. The LLM then generates a textual summary that provides a clear and accurate explanation of the relevant statistical insights. This approach allows the system to generate highly tailored responses, ensuring that the outputted summaries align with the user's intent and query, while accurately reflecting the underlying data properties as indicated by the keywords.

In some embodiments, the large language model is trained by the system to generate textual summaries of inputted vectorized representations based on data keys detected in the inputted vectorized representations by receiving labeled statistical properties and labeled keywords in potential queries and training the large language model to determine the labeled statistical properties based on the labeled keywords in potential queries. For example, the system may be trained by the system to generate textual summaries of inputted vectorized representations by associating specific keywords in potential queries with the corresponding statistical properties within the data. The training process begins by providing the model with labeled training data that includes both vectorized representations containing various statistical properties (such as averages, trends, distributions, and correlations) and potential user queries that are labeled with specific keywords. These keywords indicate what type of statistical insight the user might be seeking, such as "mean," "trend," "distribution," or "correlation." During the training process, the system teaches the LLM to recognize these keywords in the queries and map them to the appropriate statistical properties in the vectorized data. For example, if the training data includes a query like "What is the average sales figure?" with the keyword "average" labeled, the system associates this keyword with the statistical property "mean" in the corresponding vectorized dataset. Similarly, a query with the keyword "trend" would guide the model to focus on identifying and summarizing temporal patterns or shifts within the vector data. The LLM is then trained to detect these keywords in potential queries and, based on this input, extract the relevant statistical information from the vectorized data. Through this training, the model learns how to interpret the queries and understand which statistical properties are most important based on the detected keywords. This enables the model to generate accurate, contextually relevant textual summaries by focusing on the appropriate statistical features. As the training continues, the LLM becomes increasingly adept at recognizing patterns in the inputted queries and determining which statistical properties to prioritize based on the labeled keywords. Once fully trained, the model can generate textual summaries that align with the user's query, accurately reflecting the statistical insights embedded in the vectorized data. This process ensures that the LLM can effectively respond to diverse user queries by interpreting the intent behind the keywords and producing summaries that meet the user's informational needs.

At step 408, process 400 (e.g., using one or more components described above) generates a textual summary output by the first large language model. For example, the system may generate for display, in the first user interface, a first textual summary output by the first large language model in response to the first query.

In some embodiments, the system generates for display the first textual summary output by the large language model in response to the first query by determining descriptive text for statistical data in the first secured dataset and retrieving raw data from the first secured dataset. A system generates for display the first textual summary output by the LLM in response to the first query by combining descriptive text with raw data from the first secured dataset. The process begins by determining the descriptive text for the statistical data within the secured dataset. This involves analyzing the dataset using the appropriate profiling type (e.g., statistical summaries, distributions, or correlations) and extracting key insights such as averages, trends, or other relevant metrics. The system then formulates a descriptive narrative around these insights, translating the statistical results into human-readable language that conveys the key findings in a clear and concise manner. Once the descriptive text is generated, the system retrieves the raw data from the first secured dataset. This raw data is necessary to complement the narrative by providing concrete figures or examples that support the descriptive summary. For instance, if the descriptive text mentions that "sales have increased by 10% over the past quarter," the raw data would include specific figures on sales for each relevant time period. The system ensures that the raw data is securely retrieved, adhering to all necessary privacy and security protocols. After combining the descriptive text and raw data, the system sends this information to the LLM. The LLM then refines the content, ensuring that the summary is both coherent and contextually appropriate for the query. The model may adjust the wording, rephrase certain parts, or enhance the explanation to ensure that the summary is informative and accessible to the user. Once the LLM has completed the summary, the system generates it for display, presenting the user with a well-rounded textual output that integrates both descriptive insights and supporting raw data from the first secured dataset. This process enables the system to deliver a clear, accurate, and data-driven response to the user's query.

In some embodiments, the system may generate for display the first textual summary output by the large language model in response to the first query by summarizing the first vectorized representation and generating the first textual summary output based on the first vectorized representation. For example, the system generates the first textual summary output in response to the first query by leveraging the first vectorized representation of the secured dataset. After the system has created the vectorized representation, which encodes the key features, patterns, and relationships of the data, it passes this representation to the LLM for interpretation. The LLM uses this vectorized data as its input, enabling it to understand and summarize the dataset's contents in a highly efficient and structured way. The vectorized representation simplifies the dataset by distilling its most important characteristics into a numerical format, capturing aspects such as statistical summaries, trends, or correlations, depending on the profiling type. The system then tasks the LLM with summarizing this compressed data, allowing it to generate descriptive text that explains the insights found in the vectorized representation. This summary can include details such as significant trends, key metrics, or anomalies detected within the dataset, based on the context of the query. The LLM processes the vectorized data to generate a coherent and readable textual summary that accurately reflects the dataset's insights. The textual output is crafted using natural language generation techniques, transforming the abstract vector data into human-readable content. The system ensures that the textual summary is both informative and aligned with the user's query, presenting a concise explanation of the dataset's key points without overwhelming the user with unnecessary details. By summarizing the first vectorized representation, the system efficiently condenses large or complex datasets into clear and actionable insights, which are then displayed as a well-formulated response to the user's query.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for improved data processing of large datasets across secured computing networks.
2. The method of the preceding embodiment, further comprising: receiving, via a first user interface, a first query corresponding to a first dataset; in response to the first query, retrieving a first vectorized representation, wherein the first vectorized representation is based on a first data profile of the first dataset and a first data key for the first data profile, wherein the first data key indicates a first profiling type of a plurality of profiling types used to generate the first data profile; inputting the first vectorized representation into a large language model, wherein the large language model is trained to generate textual summaries of inputted vectorized representations based on data keys detected in the inputted vectorized representations in response to queries; and generating for display, in the first user interface, a first textual summary output by the large language model in response the first query.
3. The method of any one of the preceding embodiments, wherein generating the first data key further comprises: determining the first profiling type of the plurality of profiling types; selecting a first value corresponding to the first profiling type; and embedding the first value in the first vectorized representation.
4. The method of any one of the preceding embodiments, wherein generating the first data profile of the first dataset further comprises: selecting the first profiling type of the plurality of profiling types; and executing the first profiling type on the first dataset.
5. The method of any one of the preceding embodiments, further comprising: receiving a first secured processing request for processing a first secured dataset stored at a first secured network location of a first secured computer network; in response receiving the first secured processing request, generating a first secured data profile of the first secured dataset; generating a first secured data key for the first secured data profile, wherein the first secured data key indicates a first secured profiling type of a plurality of secured profiling types used to generate the first secured data profile; generating a first vectorized representation of the first secured data profile and the first secured data key; receiving, via a first user interface, a first query corresponding to the first secured dataset; in response to the first query, inputting the first vectorized representation into a large language model stored at a second secured network location of the first secured computer network, wherein the large language model is trained to generate textual summaries of inputted vectorized representations based on data keys detected in the inputted vectorized representations in response to queries; and generating for display, in the first user interface, a first textual summary output by the large language model in response the first query.
3. The method of any one of the preceding embodiments, wherein generating the first vectorized representation of the first secured data profile and the first secured data key further comprises: determining a metadata framework for the first vectorized representation; and embedding the first secured data key into the metadata framework.
4. The method of any one of the preceding embodiments, wherein generating the first vectorized representation of the first secured data profile and the first secured data key further comprises: determining a vector structure for the first vectorized representation; and embedding the first secured data key into the vector structure.
5. The method of any one of the preceding embodiments, wherein generating the first secured data key further comprises: determining the first secured profiling type of the plurality of secured profiling types; selecting a first value corresponding to the first secured profiling type; and embedding the first value in the first vectorized representation.
6. The method of any one of the preceding embodiments, wherein generating the first secured data profile of the first secured dataset further comprises: selecting the first secured profiling type of the plurality of secured profiling types based on the first secured processing request; and executing the first secured profiling type on the first secured dataset.
7. The method of any one of the preceding embodiments, wherein generating the first secured data profile of the first secured dataset further comprises: accessing a data stream of the first secured dataset; and generating a snapshot of the data stream based on the first secured processing request.
8. The method of any one of the preceding embodiments, wherein generating the first secured data profile of the first secured dataset further comprises: receiving a first instance of the first secured dataset; receiving a second instance of the first secured dataset; determining a difference between the first instance and the second instance at a first time point; and determining the first secured data key based on the first time point.
9. The method of any one of the preceding embodiments, wherein generating the first secured data profile of the first secured dataset further comprises: receiving the first secured dataset, wherein the first secured dataset has a first identifier; receiving a second secured dataset, wherein the second secured dataset has a second identifier; merging the first secured dataset and the second secured dataset; and determining the first secured data key based on the first identifier and the second identifier.
10. The method of any one of the preceding embodiments, wherein generating the first secured data profile of the first secured dataset further comprises: receiving the first dataset, wherein the first dataset has a first identifier; receiving a second dataset, wherein the second dataset has a second identifier; merging the first dataset and the second dataset; and determining the first secured data key based on the first identifier and the second identifier.

11. The method of any one of the preceding embodiments, wherein generating the first vectorized representation of the first secured data profile and the first secured data key further comprises: performing a first compression on the first secured dataset when generating the first secured data profile; and performing a second compression on the first secured dataset when generating the first vectorized representation.

12. The method of any one of the preceding embodiments, wherein generating for display the first textual summary output by the large language model in response to the first query further comprises: determining descriptive text for statistical data in the first secured dataset; and retrieving raw data from the first secured dataset.

13. The method of any one of the preceding embodiments, wherein generating for display the first textual summary output by the large language model in response to the first query further comprises: summarizing the first vectorized representation; and generating the first textual summary output based on the first vectorized representation.

14. The method of any one of the preceding embodiments, wherein the large language model is trained to generate textual summaries of inputted vectorized representations based on data keys detected in the inputted vectorized representations by: receiving historical vectorized representations with labeled statistical properties and labeled data keys; and training the large language model to determining the labeled statistical properties in the historical vectorized representations based on the labeled data keys.

15. The method of any one of the preceding embodiments, wherein the large language model is trained to generate textual summaries of inputted vectorized representations based on data keys detected in the inputted vectorized representations by: receiving labeled statistical properties and labeled keywords in potential queries; and training the large language model to determine the labeled statistical properties based on the labeled keywords in potential queries.

16. The method of claim 2, wherein the large language model is trained to generate textual summaries of inputted vectorized representations based on data keys detected in the inputted vectorized representations by: receiving labeled statistical properties and labeled keywords in potential queries; and training the large language model to determine the labeled statistical properties based on the labeled keywords in potential queries.

17. The method of any one of the preceding embodiments, further comprising: generating a second secured data profile of the first secured dataset using a second secured profiling type of the plurality of secured profiling types; determining a second secured data key for the second secured data profile based on the second secured profiling type; generating a second vectorized representation of the second secured data profile and the second secured data key; storing the first vectorized representation and the second vectorized representation in a vector database; selecting the first vectorized representation for inputting into the large language model based on the first query.

18. One or more non-transitory, computer-readable mediums storing instructions that, when executed by a data processing apparatus, cause the data processing apparatus to perform operations comprising those of any of embodiments 1-17.

19. A system comprising one or more processors; and memory storing instructions that, when executed by the processors, cause the processors to effectuate operations comprising those of any of embodiments 1-17.

20. A system comprising means for performing any of embodiments 1-17.

What is claimed is:

1. A system for improved data processing of datasets across computing networks while maintaining encryption of data, the system comprising:

one or more processors; and one or more non-transitory, computer-readable media, comprising instructions that, when executed by the one or more processors, cause operations comprising:

receiving, via a user interface, a first query corresponding to a first dataset, wherein the first dataset is stored at a first network location of a first computer network;

in response to the first query, generating a first network processing request to:

generate a first data profile of the first dataset by:

accessing a data stream of the first dataset; and generating a snapshot of the data stream based on the first query;

generate a first data key for the first data profile, wherein the first data key indicates a first profiling type of a plurality of profiling types used to generate the first data profile;

generate a first vectorized representation of the first data profile and the first data key;

executing the first network processing request using the first computer network;

determining a second network location of a large language model stored at the second network location of the first computer network, wherein the large language model is trained to generate textual summaries of inputted vectorized representations based on data keys detected in the inputted vectorized representations in response to queries;

inputting the first vectorized representation into the large language model to generate a first output;

receiving, via a user interface, the first query corresponding to the first dataset; and generating for display, in the user interface, a first textual summary based on the first output.

2. A method for improved data processing of datasets across computing networks, the method comprising:

receiving a first processing request for processing a first dataset stored at a first network location of a first computer network;

in response receiving the first processing request, generating a first data profile of the first dataset by:

accessing a data stream of the first secured dataset; and generating a snapshot of the data stream based on the first processing request;

generating a first data key for the first data profile, wherein the first data key indicates a first profiling type of a plurality of profiling types used to generate the first data profile;

generating a first vectorized representation of the first data profile and the first data key;

receiving, via a user interface, a first query corresponding to the first dataset;

in response to the first query, inputting the first vectorized representation into a large language model stored at a second network location of the first computer network, wherein the large language model is trained to generate textual summaries of inputted vectorized representations based on data keys detected in the inputted vectorized representations in response to queries; and generating for display, in the user interface, a first textual summary output by the large language model in response the first query.

3. The method of claim 2, wherein generating the first vectorized representation of the first data profile and the first data key further comprises:

determining a metadata framework for the first vectorized representation; and embedding the first data key into the metadata framework.

4. The method of claim 2, wherein generating the first vectorized representation of the first data profile and the first data key further comprises:

determining a vector structure for the first vectorized representation; and embedding the first data key into the vector structure.

5. The method of claim 2, wherein generating the first data key further comprises:

determining the first profiling type of the plurality of profiling types;

selecting a first value corresponding to the first profiling type; and embedding the first value in the first vectorized representation.

6. The method of claim 2, wherein generating the first data profile of the first dataset further comprises:

selecting the first profiling type of the plurality of profiling types based on the first processing request; and executing the first profiling type on the first dataset.

7. The method of claim 2, wherein generating the first data profile of the first dataset further comprises:

receiving a first instance of the first dataset;

receiving a second instance of the first dataset;

determining a difference between the first instance and the second instance at a first time point; and determining the first data key based on the first time point.

8. The method of claim 2, wherein generating the first data profile of the first dataset further comprises:

receiving the first dataset, wherein the first dataset has a first identifier;

receiving a second dataset, wherein the second dataset has a second identifier;

merging the first dataset and the second dataset; and determining the first data key based on the first identifier and the second identifier.

9. The method of claim 2, wherein generating the first data profile of the first dataset further comprises:

receiving the first dataset, wherein the first dataset has a first identifier;

receiving a second dataset, wherein the second dataset has a second identifier;

merging the first dataset and the second dataset; and determining the first data key based on the first identifier and the second identifier.

10. The method of claim 2, wherein generating the first vectorized representation of the first data profile and the first data key further comprises:

performing a first compression on the first dataset when generating the first data profile; and performing a second compression on the first dataset when generating the first vectorized representation.

11. The method of claim 2, wherein generating for display the first textual summary output by the large language model in response the first query further comprises:

determining descriptive text for statistical data in the first dataset; and retrieving raw data from the first dataset.

12. The method of claim 2, wherein generating for display the first textual summary output by the large language model in response the first query further comprises:

summarizing the first vectorized representation; and generating the first textual summary output based on the first vectorized representation.

13. The method of claim 2, wherein the large language model is trained by:

receiving historical vectorized representations with labeled statistical properties and labeled data keys; and training the large language model to determining the labeled statistical properties in the historical vectorized representations based on the labeled data keys.

14. The method of claim 2, wherein the large language model is trained by:

receiving labeled statistical properties and labeled keywords in potential queries; and training the large language model to determine the labeled statistical properties based on the labeled keywords in potential queries.

15. The method of claim 2, further comprising:

generating a second data profile of the first dataset using a second profiling type of the plurality of profiling types;

determining a second data key for the second data profile based on the second profiling type;

generating a second vectorized representation of the second data profile and the second data key;

storing the first vectorized representation and the second vectorized representation in a vector database;

selecting the first vectorized representation for inputting into the large language model based on the first query.

16. One or more non-transitory, computer-readable media, comprising instructions that, when executed by one or more processors, cause operations comprising:

receiving, via a user interface, a first query corresponding to a first dataset;

generating a first data profile of the first dataset by:

accessing a data stream of the first dataset; and generating a snapshot of the data stream based on the first query;

generating a first data key for the first data profile;

generating a first representation, wherein the first representation is based on the first dataset and the first data key, wherein the first data key indicates a first profiling type of a plurality of profiling types used to generate the first representation;

inputting the first representation into a large language model, wherein the large language model is trained to generate textual summaries of inputted representations based on data keys detected in the inputted representations in response to queries; and generating for display, in the user interface, a first textual summary output by the large language model in response to the first query.

17. The one or more non-transitory, computer-readable media of claim 16, wherein generating the first data key further comprises:

determining the first profiling type of the plurality of profiling types;

selecting a first value corresponding to the first profiling type; and embedding the first value in the first representation.

18. The one or more non-transitory, computer-readable media of claim 16, wherein generating the first representation further comprises:

selecting the first profiling type of the plurality of profiling types; and executing the first profiling type on the first dataset.

19. The one or more non-transitory, computer-readable media of claim 16, wherein generating the first representation of the first data profile and the first data key further comprises:

determining a metadata framework for the first representation; and embedding the first data key into the metadata framework.

20. The one or more non-transitory, computer-readable media of claim 16, wherein generating the first representation of the first data profile and the first data key further comprises:

determining a vector structure for the first representation; and embedding the first data key into the vector structure.

* * * * *